(12) United States Patent
Niiyama et al.

(10) Patent No.: US 8,310,649 B2
(45) Date of Patent: Nov. 13, 2012

(54) DISPLAY APPARATUS AND PROCESS FOR PRODUCING THE SAME

(75) Inventors: Satoshi Niiyama, Tokyo (JP); Hiroshige Ito, Tokyo (JP); Mika Kambe, Tokyo (JP); Naoko Aoki, Tokyo (JP); Hitoshi Tsushima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/428,388

(22) Filed: Mar. 23, 2012

(65) Prior Publication Data

US 2012/0183721 A1 Jul. 19, 2012

Related U.S. Application Data

(63) Continuation of application No. PCT/JP2010/065762, filed on Sep. 13, 2010.

(30) Foreign Application Priority Data

Sep. 25, 2009 (JP) .................. 2009-220584
Aug. 10, 2010 (JP) .................. 2010-179503

(51) Int. Cl.
*G02F 1/13* (2006.01)
(52) U.S. Cl. ......... 349/187; 349/158; 349/122; 349/153
(58) Field of Classification Search .................. 349/158, 349/153, 187, 190, 122, 137
See application file for complete search history.

(56) References Cited

U.S. PATENT DOCUMENTS

| 7,382,422 B2 | 6/2008 | Niiyama et al. |
| 7,961,281 B2 | 6/2011 | Tsuji et al. |
| 2007/0109650 A1* | 5/2007 | Yamada et al. ............... 359/589 |
| 2010/0097552 A1 | 4/2010 | Shinya et al. |
| 2010/0189932 A1 | 7/2010 | Niiyama et al. |

FOREIGN PATENT DOCUMENTS

| JP | 07-209635 | 8/1995 |
| JP | 2006-058753 | 3/2006 |
| JP | 2009-086187 | 4/2009 |
| JP | 2010-217631 | 9/2010 |
| WO | WO 2008/081838 | 7/2008 |
| WO | WO 2008/126860 | 10/2008 |
| WO | WO 2009/016943 | 2/2009 |

OTHER PUBLICATIONS

International Search Report issued Oct. 19, 2010 in PCT/JP2010/065762 filed Sep. 13, 2010.

* cited by examiner

*Primary Examiner* — Thoi Duong
(74) *Attorney, Agent, or Firm* — Oblon, Spivak, McClelland, Maier & Neustadt, L.L.P.

(57) ABSTRACT

Provided is a process for producing a display apparatus, which comprises (a) a step of forming a seal part made of e.g. a double-sided adhesive tape 12 on the edge of a surface of a display device 50 (a first plate), (b) a step of supplying a liquid photocurable resin composition 14 to a region enclosed by the seal part, (c) a step of laminating, in a reduced-pressure atmosphere of not more than 100 Pa, a transparent plate 10 (a second plate) on the photocurable resin composition 14 thereby to obtain a laminated precursor having the photocurable resin composition 14 hermetically sealed, and (d) a step of curing the photocurable resin composition 14 in such a state that the laminated precursor is placed in a pressure atmosphere of not less than 50 kPa to form a resin layer.

16 Claims, 6 Drawing Sheets

DISPLAY APPARATUS AND PROCESS FOR PRODUCING THE SAME

TECHNICAL FIELD

The present invention relates to a process for producing a display apparatus having a display device protected by a transparent plate.

BACKGROUND ART

In a display apparatus having a display device protected by a transparent plate, a space between a display surface of the display device and a protective plate made of the transparent plate disposed on the display surface to protect the display surface, is sealed by a resin layer. Particularly, a display apparatus has been known in which a protective plate made of the transparent plate is provided on a display device having an insufficient mechanical strength due to the thin thickness of a substrate on the display surface side of the display device.

As the display device, the followings are well known.

Liquid Crystal Display Device

For example, one which drives liquid crystals by a planar active element such as TFT, one which drives liquid crystals sandwiched by dot matrix-shaped electrodes in a line-sequential manner, one which drives liquid crystals sandwiched by segment-shaped electrodes statically, one which shows one liquid crystal alignment when no voltage is applied to liquid crystals, and memory-type one which shows at least two liquid crystal alignments when no voltage is applied. Further, the liquid crystal display device is not a self-luminous type device, and therefore the display of a transmission type liquid crystal device can be observed visually by using a lighting (backlight) provided on the backside, and the display of a reflection type liquid crystal display device can be observed visually by using an external light entering to its display surface or a lighting (front light). One in which a display contrast is obtained by using a polarizing plate in combination, or one in which a display contrast is obtained, without using a polarizing plate, by using a liquid crystal alignment having a light reflection function (selective reflection) or an incident light modulation function of transmission-light scattering, may be mentioned.

EL (Electroluminescence) Display Device

One in which self luminescence is obtained by applying a voltage to an emission layer comprised of an organic (OLED) or inorganic thin layer interposed between dot matrix-shaped electrodes or segment-shaped electrodes, and a display is thereby formed.

Plasma Display Device

Usually one in which a phosphor provided on an inner surface of the display surface side substrate is activated for emission of light by discharge of a gas, such as Xe, filled in a space sandwiched by electrodes disposed in a dot-matrix shape, and a display is thereby formed.

Electronic Ink Type Device

An electrophoretic device in which color is developed by changing orientation of a display ink by a voltage application, or one in which color is developed by movement of a toner via an electrostatic force or movement of pigments via electrophoresis, is known.

As the process for producing a display apparatus having a display device protected by a transparent plate, the following ones are known.

(1) A process of producing a display apparatus, comprised of forming a bonding resin by injecting a liquid raw material on a protective plate made of a resin and then curing it, or bonding a roll-sheet shaped bonding resin to a protective plate made of a resin in a deaerated state, and closely adhering a liquid crystal cell while pressing from one end in a deaerated state (Patent Document 1).

(2) A process for producing a display apparatus, comprised of positioning and temporary fixing of a display panel to a predetermined position of a protective plate made of glass by using a fixing member, and injecting a liquid resin material to a space formed between the protective plate and the display panel under a reduced pressure, followed by curing it (Patent Documents 2 and 3).

PRIOR ART DOCUMENTS

Patent Documents

Patent Document 1: JP-A-7-209635
Patent Document 2: U.S. Pat. No. 7,382,422
Patent Document 3: JP-A-2006-58753

DISCLOSURE OF INVENTION

Technical Problem

However, the process (1) has the following problems.
Since formation of a bonding resin on a protective plate and bonding of a liquid crystal cell to the formed bonding resin are carried out at separate steps, production is likely to become complicated.
Since it is necessary to use a dish-shaped protective plate having a side-wall portion on its periphery, the protective plate is required to be processed at a separate step. Further, since the size of the protective plate is limited to the same size as or smaller than the size of the liquid crystal cell, installation of the protective plate has a lot of restrictions.
During formation of the bonding resin on the protective plate, air bubbles may be formed in the liquid raw material at the time of injection.
Further, the process (2) has the following problems.
Since positioning and temporary fixation of the liquid crystal panel onto the protective plate and injection of the liquid resin material into the space between the protective plate and the liquid crystal panel, are required to be carried out at separate steps, the production process is likely to become complicated.
In the production of a large-sized display apparatus, injection of the liquid resin material may consume time, and at the same time, air bubbles may be remained in the liquid resin material at the time of injection since the degree of reduced pressure at the time of injection is from $1.33 \times 10^4$ to $6.67 \times 10^4$ Pa.
As described above, in both cases of (1) and (2), air bubbles may be formed in the resin layer interposed between the display device and the protective plate of the display apparatus. If air bubbles are formed, the following problems may occur.
The interface bonding strength between the resin layer prepared by curing a curable resin composition and the display device, or the interface bonding strength between the above-described resin layer and the protective plate of the display apparatus decreases.
If air bubbles are formed in the resin layer interposed between the display device and the protective plate of the display apparatus, outgoing light or reflected light from the display device is distorted by air bubbles, whereby the quality of a display image may be impaired significantly.

When an image is not displayed in the display device of the display apparatus, air bubbles remained in the resin layer can be observed visually easily through the protective plate, whereby the quality of the product may be impaired significantly.

The present invention is to provide a process for producing a display apparatus having a display device protected by a transparent plate, whereby the display device is less susceptible to breakage, and the interface bonding strength between a resin layer and the display device and the interface bonding strength between the resin layer and a transparent plate can be increased, while sufficiently suppressing formation of air bubbles in a liquid curable resin composition.

Solution to Problem

The process for producing a display apparatus of the present invention is a process for producing a display apparatus comprising first and second plates, of which either one is a display device and the other one is a transparent plate, a resin layer interposed between the first and second plates, and a seal part enclosing the periphery of the resin layer, which process comprises the following steps (a) to (d).

(a) A step of forming a seal part on the edge of a surface of the first plate (provided that in a case where the first plate is the display device, the seal part is formed on the edge of the surface on the side where an image is displayed).

(b) A step of supplying a liquid curable resin composition to the region enclosed by the seal part on the first plate.

(c) A step of laminating, in a reduced-pressure atmosphere of not more than 100 Pa, a second plate onto the curable resin composition formed on the first plate thereby to obtain a laminated precursor having the curable resin composition hermetically sealed by the first and second plates and the seal part (provided that in a case where the second plate is a display device, the second plate is laminated so that the surface on the side where an image is displayed, is located on the curable resin composition side).

(d) A step of curing the curable resin composition in such a state that the laminated precursor is placed in a pressure atmosphere of not less than 50 kPa to form a resin layer.

The display device is preferably a liquid crystal display device.

A light-shielding printing part may be provided on the periphery of the transparent plate.

The transparent plate is preferably a glass plate.

An antireflection layer may be formed on one side of the transparent plate.

The pressure atmosphere of not less than 50 kPa is preferably an atmospheric pressure atmosphere.

The curable resin composition is preferably a photocurable resin composition.

The photocurable resin composition is preferably comprised of at least one compound having, per molecule, from 1 to 3 groups selected from the group consisting of acryloyloxy groups and methacryloyloxy groups, and a photo-polymerization initiator.

The photocurable resin composition is preferably comprised of an oligomer having a molecular weight of at least 1,000 and having, on average per molecule, from 1.8 to 4 curable functional groups which are acryloyloxy groups and/or methacryloyloxy groups, and a hydroxyalkyl methacrylate having a $C_{3-8}$ hydroxyalkyl group wherein the number of hydroxy groups is 1 or 2.

The photocurable resin composition is preferably further contains an alkyl methacrylate having a $C_{8-22}$ alkyl group.

The photocurable resin composition preferably contains an alkyl methacrylate having a $C_{8-22}$ alkyl group in an amount of larger than the content of a hydroxyalkyl methacrylate having a $C_{3-8}$ hydroxyalkyl group wherein the number of hydroxy groups is 1 or 2.

The photocurable resin composition on the laminated precursor is preferably cured by applying light under a pressure atmosphere of not less than 50 kPa.

The seal part formed on the edge of the first plate is preferably made of a sealing material comprised of a photocurable resin composition having a viscosity at 25° C. of from 200 to 3,000 Pa·s.

It is preferred that the seal part is cured by applying light via the transparent plate before curing the photocurable resin composition.

The seal part is preferably cured by applying light from the side of the transparent plate.

The display apparatus of the present invention is comprised of first and second plates, of which either one is a display device and the other one is a transparent plate, a resin layer interposed between the first and second plates, and a seal part seamlessly enclosing the periphery of the resin layer.

Further, the display apparatus of the present invention relates to a display apparatus obtained by each production process described above, comprising first and second plates, of which either one is a display device and the other one is a transparent plate, a resin layer interposed between the first and second plates, and a seal part interposed between the first and second plates, while seamlessly enclosing the periphery of the resin layer.

Advantageous Effects of Invention

According to the process for producing a display apparatus of the present invention, the display device can be made to be less susceptible to breakage, and the interface bonding strength between a resin layer and the display device and the interface bonding strength between the resin layer and a transparent plate can be increased, while sufficiently suppressing formation of air bubbles in a liquid curable resin composition.

The display apparatus of the present invention is less susceptible to breakage, and has a high interface bonding strength between the resin layer and the display device and a high interface bonding strength between the resin layer and the transparent plate, and formation of air bubbles remained in its resin layer is sufficiently suppressed. Particularly, the present invention is excellent in terms of the capability for bonding in a good flatness a transparent plate to a display device having a large area such as a large-sized liquid crystal device.

DESCRIPTION OF EMBODIMENTS

In the present invention, the following definitions will apply.

In the display apparatus, the transparent plate for the protective plate of the display device is referred to as "the front plate", and the display device is referred to as "the back plate".

The front plate and the back plate are generally referred to as "plates".

Among the plates, the plate wherein a seal part is formed on its edge and a liquid curable resin composition is supplied to the region enclosed by the seal part in the production process of the present invention, is referred to as "the first plate", and the plate to be laminated on the curable resin composition is referred to as "the second plate".

A plate having optical transparency is referred to as "a transparent plate".

A transparent plate made of glass is referred to as "a glass plate".

A laminated member obtained by the above-described step (c) of the process for producing a display apparatus of the present invention wherein the curable resin composition is sealed by the first plate, the second plate, and the seal part, and which is one before application of the above step (d), is referred to as "a laminated precursor".

<Display Apparatus>

As the display apparatus in the present invention, the following one may be mentioned.

A display apparatus having a display device protected by a transparent plate, wherein the transparent plate for the protective plate of the display device is the front plate and the display device is the back plate.

Figure 1:
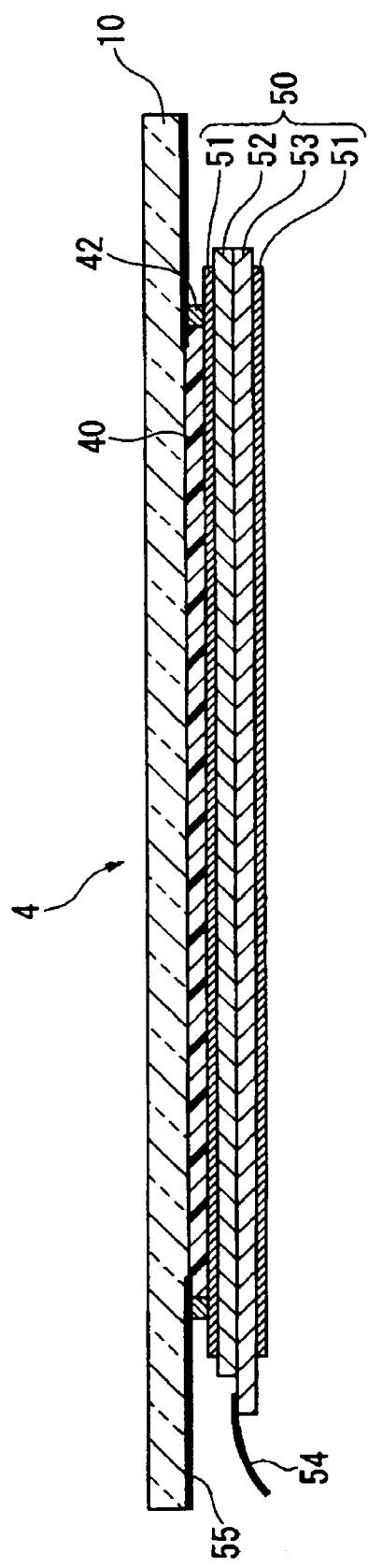
FIG. 1 is a cross-sectional view illustrating an example of the embodiment of the display apparatus in the present invention.
Figure 2:
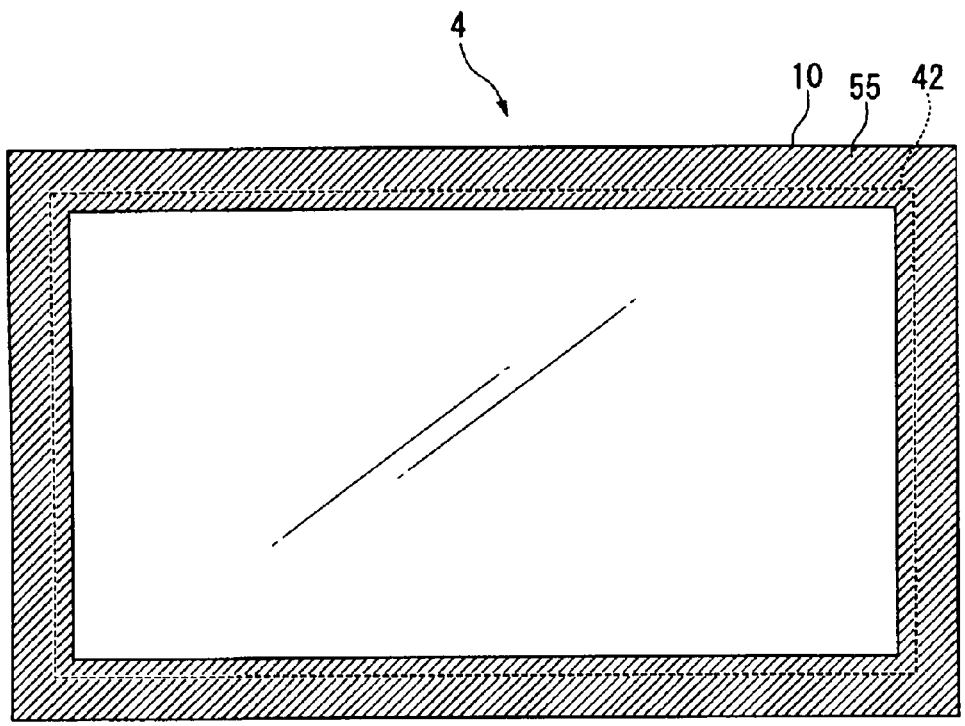
FIG. 2 is a front view illustrating an example of the embodiment of the display apparatus in the present invention.

FIG. 1 is a cross-sectional view illustrating an example of the embodiment of the display apparatus in the present invention, and FIG. 2 is a front view.

The display apparatus 4 comprises a transparent plate 10 as the front plate, a display device 50 as the back plate, a resin layer 40 interposed between the transparent plate 10 and the display device 50, a seal part 42 enclosing the periphery of the resin layer 40, and a flexible printed circuit board (FPC) 54 provided with a driver IC which is connected to the display device 50 and drives the display device 50. Here, in a case where a seal part is formed on the periphery of the above transparent plate 10 and then a liquid curable resin composition is supplied to the region enclosed by the seal part, the transparent plate 10 becomes the first plate and the display device 50 becomes the second plate. On the other hand, in a case where a seal part is formed on the periphery of the above display device 50 and a liquid curable resin composition is supplied to the region enclosed by the seal part, the display device 50 becomes the first plate, and the transparent plate 10 becomes the second plate.

In FIG. 1, the display device 50 is illustrated as an example of a liquid crystal display device having a construction wherein a transparent plate 52 provided with a color filter and a transparent plate 53 provided with TFT is bonded and then sandwiched by a pair of polarizing plates 51, but its construction is not limited thereto.

Further, in FIGS. 1 and 2, a construction wherein a light-shielding printing part 55 is formed on the periphery of the transparent plate 10 is illustrated.

(Front Plate)

The front plate is a protective plate of a display device, and is a transparent plate which transmits a display image of the display device.

As the transparent plate, a glass plate or a transparent resin plate may be mentioned, and a glass plate is most preferred not only from the viewpoint such that the transparency to outgoing light or reflected light from a display device forming a display image is high, but also from such a viewpoint that it has light stability, a low birefringence, a high flatness, scratch resistance and a high mechanical strength. A transparent plate is preferred also from such a viewpoint that the photocurable resin composition can be cured by incident light from the front plate.

As the material for the glass plate, soda lime glass is preferred, but a glass material such as a highly transparent glass (colorless glass) having a lower iron content and a lower bluish color is more preferred. As the front plate, strengthened glass may be employed to increase safety, and a glass plate obtained by a chemical strengthening method is preferably used for the case wherein the thickness is not more than 1.5 mm.

The material for a transparent resin plate may, for example, be a highly transparent resin material (such as polycarbonate or polymethylmethacrylate).

By providing an antireflection layer on the backside of the surface of the transparent plate bonded to the resin layer, it becomes possible to increase a contrast ratio of display image, such being preferred. The antireflection layer may be formed by providing an inorganic thin film on the surface of the transparent plate directly, or bonding a transparent resin film provided with an antireflection layer to the transparent plate.

It is also possible to cover e.g. a wiring member connected to the display device by providing a light-shielding printing part on the periphery of the transparent plate, thereby to prevent visual observation of the region other than the image display region of the display device from the front plate side. In this case, the light-shielding printing part can be provided on the surface of the transparent plate bonded to the resin layer, or its backside, but is preferably provided on the surface bonded to the resin layer from the viewpoint of reducing parallax between the light-shielding part and the image display part. In a case where the transparent plate is a glass plate, printing with a ceramic paint containing a black pigment is preferably carried out since the light-shielding property of the light-shielding printing part is thereby increased. The light-shielding printing part can be formed by bonding a transparent film provided with a light-shielding printing part on its front surface or backside, to the transparent plate. In a case where the thickness of the transparent plate is relatively thin, i.e. not more than 1 mm, the parallax between the light shielding part and the image display part does not increase much even if a transparent film provided with a light-shielding printing part is bonded to the backside of the surface bonded to the resin layer. The transparent plate having no light-shielding printing part may be used.

On the surface of the transparent plate bonded to the resin layer, other functional layers such as a touch panel or a 3D filter may be provided. In this case, the resin layer has a configuration of bonding the other functional layers on the transparent plate to the back plate.

To the transparent plate, surface treatment may be applied to improve the interface bonding strength to the resin layer. The method for such surface treatment may, for example, be a method of treating the surface of the transparent plate with a silane coupling agent, or a method of forming a thin film of silicon oxide on the surface of the transparent plate.

The thickness of the transparent plate is usually from 0.5 to 25 mm for the glass plate, from the viewpoint of the mechanical strength and transparency. However, for the indoor use applications such as a display for personal computer and home electric appliances like television, the thickness is preferably from 0.7 to 6 mm since the weight of the glass plate increases as the increase in the thickness of the glass plate. For the public display applications like outdoor public display, the thickness is preferably from 3 to 20 mm. The thickness may appropriately be selected according to the size of a display device and its usage. For the transparent resin plate, the thickness is preferably from 2 to 10 mm.

Particularly, there has been a tendency of further increase in size and decrease in thickness for the glass substrate for a display device, and specifically, glass having a thickness of from about 0.5 to 1.5 mm has been sometimes used. For such a case, a chemical strengthening treatment may be applied on the glass substrate to increase the strength of the glass substrate, such being preferred.

(Back Plate)

The back plate is a display device. The display device has a display material which changes its optical property based on an external electrical signal and is interposed between a pair of electrodes at least one of them is a transparent electrode, and the display device may, for example, be classified as a liquid crystal display device, an EL display device, a plasma display device and an electronic ink type display device, based on the type of the display material. Further, the display device has a structure wherein a pair of plates, at least one of which is a transparent plate, are bonded to each other, and the transparent plate side is disposed so that it faces to the resin layer. In this case, in some display devices, other functional members such as a polarizing plate, a retardation plate, a touch panel and a 3D filter may be disposed on the outermost layer of the transparent plate side facing to the resin layer. In this case, the resin layer has a configuration of bonding the other functional members on the display device to the front plate.

There is a case wherein the above-described other functional members are formed on the other transparent plate by coating such a functional layer or bonding a film having such a functional layer (hereinafter referred to as a functional plate). In this case, a laminated member may be preliminarily prepared according to the after-described production process to use the display device and the functional plate as the back plate. Further, one prepared by laminating the above-described front plate onto the functional plate by the after-described production process may be used as the front plate. In this case, the functional plate is laminated so that it faces to the side facing to the back surface of the front plate. The functional plate may have different functional layers on its front surface and backside, such as one having a touch panel formed on one surface and a 3D filter formed on the other surface. In such a case, the surface to be bonded to the front plate or the surface to be bonded to the back plate is appropriately selected based on its function.

The display apparatus containing the functional plate has a structure comprised of three plates and two resin layers interposed between each of the plates, and the resin layer interposed between the front plate and the functional plate may be identical to or different from the resin layer interposed between the back plate and the functional plate.

On the periphery of the display device, a wiring member such as FPC for conducting an electrical signal to operate the display device may be provided. From the viewpoint such that installation of the wiring member while holding each of the plates at the time of lamination becomes easier, the back plate is preferably used as the first plate so that it becomes the lower plate at the time of lamination.

On the surface of the display device to be bonded to the resin layer, surface treatment may be applied to improve the interface bonding strength to the seal part. The portion where such a surface treatment is applied may be only the edge or may be the entire surface of the plate. The method for the surface treatment may, for example, be a method of treating with a cold-processable bonding primer.

The thickness of the display device is usually from 0.4 to 4 mm for the liquid crystal display device operated by TFT, and is usually from 0.2 to 3 mm for the EL display device.

(Resin Layer)

The resin layer is a layer which plays a role of bonding the front plate and the back plate eventually, and it is a layer formed by curing the after-described curable resin composition. The curable resin composition is preferably a resin composition which has a low elastic modulus of a resin after curing. The reason is that if the elastic modulus of the resin layer is large, the stress formed by curing shrinkage at the time of curing the resin may adversely affect the display performance of the display device.

The thickness of the resin layer is not particularly limited and may be adjusted to be a necessary thickness depending upon the particular purpose, and is preferably from 0.03 to 2 mm, particularly preferably from 0.1 to 0.8 mm. If the thickness is less than 0.03 mm, it may become difficult for the resin layer to protect the display device by effectively buffering an external impact from the transparent plate side. Further, if contaminant having a thickness of larger than the thickness of the resin layer is introduced at the laminating step of the transparent plate and the display device, the optical transparency of the resin layer may adversely be affected since the thickness of the resin layer changes at that portion. On the other hand, if the thickness of the resin layer exceeds 2 mm, formation of residual air bubbles in the resin layer may be increased, or the thickness of the entire display apparatus including the transparent plate may be increased unnecessarily.

A method for adjusting the thickness of the resin layer may, for example, be a method of adjusting the thickness of the after-described seal part, or a method of adjusting the amount of the curable resin composition to be supplied to the first plate. For example, in a case where a double-sided adhesive tape is employed as the seal part, the thickness of the resin layer can be determined by using a double-sided adhesive tape having a thickness which meets the purpose. In a case where a seal part made of a material which can change its thickness by a compression force easily (such as an elastic material or a uncured curable resin composition) is used, spacer particles having a predetermined particle diameter may be disposed at the seal part.

(Seal Part)

The seal part is one made of the after-described sealing material (such as a double-sided adhesive tape or a curable resin composition). Since the region outside of the image display region of the display device where a seal is placed thereon is relatively narrow, it is preferred to provide a seal part having a narrow width. Depending upon the thickness of the resin layer, the width of the seal part is preferably from 0.5 to 2 mm, more preferably from 0.8 to 1.6 mm. To provide a seal part having a narrow width, it is preferred to use a high viscosity curable resin material as the sealing material. The sealing material is preferably a curable resin material having a viscosity at room temperature of from 200 to 3,000 Pa·s, more preferably a curable resin material having a viscosity of from 500 to 2,000 Pa·s, particularly preferably a curable resin material having a viscosity of from 1,000 to 2,000 Pa·s.
(Shape)

The shape of the display apparatus is usually rectangular.

In the production process of the present invention, the supplying of a curable resin composition forming a resin layer to the first plate is carried out very easily, and particularly, the resin layer can be provided on a plate having a large area in a short period of time by using a plurality of a coating apparatus and a dropping apparatus in combination for the curable resin composition to be supplied.

The size of the display apparatus is, since the production process of the present invention is particularly suitable for the production of a display apparatus having a relatively large area as described above, suitably at least 0.3 m of a long side length×at least 0.18 m of a short side length for the case of a PC monitor using a liquid crystal display device, and is suitably at least 0.5 m of a long side length×at least 0.4 m of a short side length, particularly preferably at least 0.7 m of a long side length×at least 0.4 m of a short side length, for the case of a television receiver. The upper limit in the size of the display apparatus is determined by the size of the display device, and the display apparatus having too large size is likely to show difficulties in its handling for e.g. installation. The upper limit in the size of the display apparatus is usually 2.5 m of a long side length×1.5 m of a short side length, from such restrictions. For the case of a small-sized display, the size is preferably at least 0.14 m of a long side length×at least 0.08 m of a short side length, but it is not limited thereto.

For the display apparatus, the size of the transparent plate as the front plate may not be identical to the size of the display device as the back plate, but by the relationship with other chassis to which the display apparatus is housed, the front plate is slightly larger than the back plate in many cases. Further, on the contrary, by the structure of the other chassis, the front plate may be slightly smaller than the back plate.

<Process for Producing a Display Apparatus>

The process for producing the display apparatus of the present invention is a process comprising the following steps (a) to (d).

(a) A step of forming a seal part on the edge of a surface of the first plate (provided that in a case where the first plate is the display device, the seal part is formed on the edge of the surface on the side where an image is displayed). Further, the above-described first plate may be a front plate or a back plate.

(b) A step of supplying a liquid curable resin composition to the region enclosed by the seal part on the first plate.

(c) A step of laminating, in a reduced-pressure atmosphere of not more than 100 Pa, a second plate onto the curable resin composition formed on the first plate thereby to obtain a laminated precursor having the curable resin composition hermetically sealed by the first and second plates and the seal part (provided that in a case where the second plate is a display device (i.e. a back plate), the second plate is laminated so that the surface on the side where an image is displayed, is located on the curable resin composition side). Further, in a case where the second plate is a transparent plate (i.e. a front plate) and an antireflection layer is provided on the surface of the second plate, the second plate is laminated so that the surface on its backside is located on the curable resin composition side).

(d) A step of curing the curable resin composition in such a state that the laminated precursor is placed in a pressure atmosphere of not less than 50 kPa to form a resin layer.

The production process of the present invention is a process wherein the liquid curable resin composition is sealed between the first and second plates in a reduced-pressure atmosphere, and then, the sealed curable resin composition is cured in a high pressure atmosphere such as an atmospheric pressure atmosphere to form the resin layer. The sealing of the curable resin composition under reduced pressure is not a method of injecting the curable resin to a wide space with a narrow gap between the first and second plates but a method for supplying the curable resin composition substantially over the entire surface of the first plate and then laminating the second plate to seal the curable resin composition between the first and second plates.

With respect to the method for sealing a liquid curable resin composition under reduced pressure and curing the curable resin composition under atmospheric pressure, reference is made, for example, to the method for producing a laminated safety glass and the photocurable resin composition to be used in the method, as disclosed in WO 2008/81838 or WO 2009/16943 (which is incorporated herein).

(Step (a))

Firstly, a seal part is formed along the peripheral portion on one surface of the first plate. It is optional to use the back plate or the front plate as the first plate.

In a case where the first plate is a transparent plate for a protective plate of the display device, the surface on which the seal part is to be formed is either one of the two surfaces. In a case where the two surfaces are different in nature, either one of them is selected for use. For example, in a case where surface treatment to improve the interface bonding strength to the resin layer is applied to one surface, the seal part is formed on such a surface. Further, in a case where an antireflection layer is provided on one surface, the seal part is formed on the backside thereof.

In a case where the first plate is a display device, the surface on which the seal part is to be formed is the front surface on the side where an image is displayed.

For the seal part, an interface bonding strength sufficient to prevent leakage of the liquid curable resin composition from the interface of the seal part and the first plate and from the interface between the seal part and the second plate in the after-described step (c), and rigidity sufficient to maintain the shape, are important. Accordingly, the seal part is preferably a sealing material having an adhesive or tackifier on its surface. As such a sealing material, the following ones may be mentioned.

A tape- or rod-form elongated member having an adhesive layer or a tackifier layer preliminarily provided on its surface (such as a double-sided adhesive tape).

One wherein an adhesive layer or a tackifier layer is formed along the edge on a surface of the first plate, and then an elongated member is bonded thereto.

Using a curable resin composition, a dam-form seal precursor is formed by printing or dispensing along the edge on a surface of the first plate, followed by curing the curable resin composition, and then, an adhesive layer or a tackifier is formed on its surface.

Further, as the sealing material, a high viscosity curable resin composition may be used without curing. As such a high viscosity curable resin composition, a photocurable resin composition is preferred. Further, in order to maintain a space between the first and second plates, spacer particles having a predetermined particle size may be incorporated to the curable resin composition. The seal part formed from the curable resin composition to form the seal part, may be cured at the same time as curing of the curable resin composition to form the resin layer, or may be cured before curing the curable resin composition to form the resin layer.

In order to form a predetermined space between the first and second plates, i.e. in order to make the resin layer to have a predetermined thickness, a necessary amount of the uncured curable resin composition is supplied to the region enclosed by the seal part on the first plate. In a case where a high viscosity curable resin composition is used without curing as the sealing material, it is preferred to form it slightly thicker than the predetermined thickness of the above-mentioned resin layer.

In a case of forming a seal part by using a photocurable resin composition as a seal precursor to be formed on the edge of the first plate or the second plate, and curing it by application of light, it is preferred to cure the seal precursor before curing the curable resin composition which is supplied to form a resin layer between the first and second plates. For example, to the seal precursor formed on the edge of the first plate or the second plate, light is applied from the side of the plate, thereby to form a seal part by curing the seal precursor. Then, to the curable resin composition interposed between the first and second plates, light is applied from the main surface side of the first plate or the second plate to cure the photocurable resin composition, or heat is applied to cure it, thereby to form a resin layer between the first and second plates.

(Step (b))

After the step (a), a liquid curable resin composition is supplied to the region enclosed by the seal part on the first plate.

The amount of the curable resin composition to be supplied is preliminarily set to be such an amount that the space formed by the first and second plates is filled by the curable resin composition. At that time, preliminarily, taking into consideration the volume reduction due to curing shrinkage of the curable resin composition, the volume of the resin layer after curing can be set.

The supplying method may, for example, be a method wherein the first plate is placed horizontally, and the curable resin composition is supplied in a dot shape, in a line shape or in a planar shape by a supplying means such as a disperser or a die coater.

In the production process of the present invention, as compared with a conventional method for injecting a curable resin to a space between the protective plate and the display panel, it is possible to employ a high viscosity curable resin composition or a curable resin composition containing a high molecular weight curable compound (such as an oligomer).

By a high molecular weight curable compound, the number of chemical bonding in the curable resin composition can be made small, and accordingly, curing shrinkage of the resin layer upon curing the curable resin composition can be made small, and the mechanical strength can be improved. On the other hand, many of high molecular weight curable compounds have a high viscosity. Therefore, from the viewpoint of suppressing residual air bubbles while securing the mechanical strength of the resin layer, it is preferred to adjust the viscosity by dissolving a curable monomer having a smaller molecular weight in the high molecular weight curable compound. However, by using a curable monomer having a small molecular weight, the curing shrinkage of the resin layer tends to increase and the mechanical strength tends to decrease, although the viscosity of the curable resin composition can be lowered.

In the present invention, it is possible to employ a relatively high viscosity curable resin composition, whereby it is possible to reduce the curing shrinkage and to improve the mechanical strength. The viscosity of the photocurable resin composition at 40° C. is preferably not higher than 50 Pa·s.

The curable resin composition is preferably a photocurable resin composition. As compared with a thermosetting resin, a photocurable resin composition is cured in a short period of time by a less amount of thermal energy. Accordingly, by using the photocurable resin composition, the environmental load to the display device will decrease. Further, the photocurable resin composition can be substantially cured in a few minutes to a few tens minutes, whereby the efficiency for the production of the display apparatus is high.

The photocurable resin composition is a material which is curable by a function of light to form a resin layer. As such a photocurable resin composition, the following ones may, for example, be mentioned and may be used within a range wherein the hardness of the resin layer will not be too high.

A composition comprising a compound having an addition-polymerizable unsaturated group and a photopolymerization initiator.

A composition containing a polyene compound having from 1 to 6 unsaturated groups (such as a triallylisocyanurate) and a polythiol compound having from 1 to 6 thiol groups (triethylene glycol dimercaptan) in such a ratio that the numbers of mols of the unsaturated groups and the thiol groups are substantially equal, and further containing a photopolymerization initiator.

A composition comprising an epoxy compound having at least two epoxy groups, and a photo-cation-generating agent.

The photocurable resin composition is more preferably one comprising at least one compound having a group (hereinafter referred to as a (meth)acryloyloxy group) selected from an acryloyloxy group and a methacryloyloxy group, and a photopolymerization initiator, since the curing rate is high, and the transparency of the resin layer will be high.

The compound having a (meth)acryloyloxy group (hereinafter referred to also as a (meth)acrylate compound) is preferably a compound having from 1 to 6 (meth)acryloyloxy groups per molecule, particularly preferably a compound having from 1 to 3 (meth)acryloyloxy groups per molecule, since the resin layer will not be too hard.

The (meth)acrylate compound is preferably an aliphatic or alicyclic compound not containing an aromatic ring as far as possible, from the viewpoint of the light stability of the resin layer.

The (meth)acrylate compound is more preferably a compound having a hydroxy group with a view to improving the interface bonding strength. The content of the (meth)acrylate compound having a hydroxy group is preferably at least 25 mass %, more preferably at least 40 mass % in all (meth)acrylate compounds. On the other hand, a compound having a hydroxy group tends to have a high elastic modulus after curing, and particularly in a case where a methacrylate having a hydroxy group is employed, the cured product is likely to be too hard. For use in a display apparatus, a resin layer having a low elastic modulus is preferred, and therefore the content of the methacrylate having a hydroxy group is preferably at most 40 mass %, more preferably at most 30 mass %, in all (meth)acrylate compounds.

The (meth)acrylate compound may be a relatively low molecular weight compound (hereinafter referred to as a (meth)acrylate monomer) or a relatively high molecular weight compound having repeating units (hereinafter referred to as a (meth)acrylate oligomer).

The (meth)acrylate compound may, for example, be one composed of at least one (meth)acrylate monomer, one composed of at least one (meth)acrylate oligomer, or one composed of at least one (meth)acrylate monomer and at least one (meth)acrylate oligomer, preferably one composed of at least one acrylate oligomer, or one composed of at least one acrylate oligomer and at least one (meth)acrylate monomer. For the purpose of increasing the adhesion between the display device and the resin layer, particularly preferred is a curable resin composition comprising an urethane type oligomer having an average of from 1.8 to 4 curable functional groups, per molecule, selected from one or both of acryloyloxy groups and methacryloyloxy groups, and a hydroxyalkyl methacrylate having a $C_{3-8}$ hydroxyalkyl group wherein the number of hydroxy groups is 1 or 2.

Further, for bonding the display device and the transparent plate, to prevent an adverse effect of curing shrinkage during curing process on the display performance of the display device, a resin layer containing a lower elastic modulus is preferred. A curable resin composition comprises an oligomer having, on average per molecule, from 1.8 to 4 curable functional groups which are acryloyloxy groups, a hydroxyalkyl methacrylate having a $C_{3-8}$ hydroxyalkyl group wherein the number of hydroxy groups is 1 or 2, and at least one (meth)acrylate monomer having no hydroxy group is preferred. Further, the total content of the (meth)acrylate monomer having no hydroxy group is preferably larger than the content of the methacrylate monomer having hydroxy group by weight ratio. Further, instead of the (meth)acrylate monomer having no hydroxy group, a hydroxyalkyl (meth)acrylate having a $C_{12-22}$ hydroxyalkyl group wherein the number of hydroxy group is 1 may be used.

In consideration of the fact that the photocurable resin composition will be placed in a reduced-pressure atmosphere in a reduced-pressured apparatus, the (meth)acrylate monomer is preferably a compound having a low vapor pressure so that the volatility can sufficiently be suppressed. In a case where the curable resin composition contains a (meth)acrylate monomer having no hydroxy group, it is possible to employ a $C_{8-22}$ alkyl (meth)acrylate, or a mono(meth)acrylate or di(meth)acrylate of a relatively low molecular weight polyether diol such as polyethylene glycol or polypropylene glycol, preferably a $C_{8-22}$ alkyl methacrylate.

The (meth)acrylate oligomer is preferably a (meth)acrylate oligomer of a molecular structure having a chain with at least two repeating units (a polyurethane chain, a polyester chain, a polyether chain, a polycarbonate chain or the like) and a (meth)acryloyloxy group. Such a (meth)acrylate oligomer may, for example, be a (meth)acrylate oligomer having an urethane bond (usually further containing a polyester chain or a polyether chain) and at least two (meth)acryloyloxy groups, so-called an urethane acrylate oligomer. Such an urethane acrylate oligomer is preferred since the mechanical performance of the resin after curing, the adhesion with substrate, etc. can widely be adjusted by the molecular design of the urethane chain.

The number average molecular weight of the (meth)acrylate oligomer is preferably from 1,000 to 100,000, more preferably from 10,000 to 70,000. When the number average molecular weight is less than 1,000, the flexibility of the resin layer may be impaired due to the increase in the crosslinked density of the resin layer after the curing. Further, when the number average molecular weight is larger than 100,000, the viscosity of the uncured curable resin composition may become too high. In a case where the viscosity of the (meth)acrylate oligomer is too high, it is preferred to use a (meth)acrylate monomer in combination thereby to lower the viscosity as the entire (meth)acrylate compound. The (meth)acrylate oligomer is more preferably an acrylate oligomer whereby the reactivity in curing can be increased.

The photopolymerization initiator may, for example, be a photopolymerization initiator of e.g. acetophenone type, ketal type, benzoin or benzoin ether type, phosphine oxide type, benzophenone type, thioxanthone type or quinone type, and a photopolymerization initiator of acetophenone type or phosphine oxide type is preferred. In a case where curing is carried out by visible light with a short wavelength, a photopolymerization initiator of phosphine oxide type is more preferred from the viewpoint of the absorption wavelength region of the photopolymerization initiator. By using two or more types of photopolymerization initiators having different absorption wavelength region in combination, it becomes possible to accelerate the curing time and increase the surface curing properties in the seal part, such being more preferred.

The photo-cation-generating agent may, for example, be a compound of onium salt type.

The curable resin composition may contain various additives such as a polymerization inhibitor, photocuring accelerator, a chain transfer agent, a photostabilizer (such as an ultraviolet absorber or a radical-capturing agent), an antioxidant, a flame retardant, an adhesive improving agent (such as a silane coupling agent), a pigment, a dye, etc., as the case requires, and it preferably contains a polymerization inhibitor and a photostabilizer. Particularly, by containing a polymerization inhibitor in an amount smaller than the polymerization initiator, it is possible to improve the stability of the curable resin composition and to adjust the molecular weight of the resin layer after curing.

However, in the case of the display apparatus, outgoing light or reflected light from the display device forming a display image is permitted to pass through the resin layer formed by curing of the curable resin composition, and therefore, it is undesirable to contain an additive which may hinder the transmission of such light. For example, an ultraviolet absorber may impart an adverse effect on the color of a display image in the display apparatus. However, on the other hand, the resin layer is required to have light stability, particularly durability against light with a short wavelength such as ultraviolet rays. Accordingly, in a case where an ultraviolet absorber or the like is to be incorporated, it is advisable to suitably adjust the absorption properties, the blend amount, etc.

In order to increase the adhesion between the display device and the resin layer or in order to adjust the elastic modulus of the resin layer, it is preferred to incorporate a chain transfer agent. A chain transfer agent having a thiol group in its molecule is particularly preferred.

The polymerization inhibitor may, for example, be a polymerization inhibitor of e.g. hydroquinone type (such as 2,5-di-t-butyl hydroquinone), catechol type (such as p-t-butyl catechol), anthraquinone type, phenothiazine type or hydroxytoluene type.

The photostabilizer may, for example, be an ultraviolet absorber (such as benzotriazole type, benzophenone type or salicylate type) or a radical-capturing agent (hindered amine type).

The antioxidant may, for example, be a compound of phosphorus type or sulfur type.

Since the curable resin composition is placed in a reduced-pressure atmosphere, the photopolymerization initiator and various additives are preferably compounds which have a relatively large molecular weight and a small vapor pressure under reduced pressure.

(Step (c))

After the step (b), the first plate having the curable resin composition supplied, is introduced into a reduced-pressure apparatus, and the first plate is placed horizontally on a fixed support table in the reduced-pressure apparatus so that the surface of the curable resin composition faces upward.

At an upper portion in the reduced-pressure apparatus, a vertically movable support mechanism is provided, and the second plate is attached to the movable support mechanism. In a case where the second plate is a display device, the surface on the side where an image is displayed is permitted to face downward. In a case where an antireflection layer is provided on the surface of the second plate, the surface on the side where the antireflection layer is not formed is permitted to face downward.

The second plate is located above the first plate and at a position not in contact with the curable resin composition. That is, the curable resin composition on the first plate and the second plate are permitted to face each other without being in contact with each other.

Otherwise, a vertically movable support mechanism may be provided at a lower portion in the reduced-pressure apparatus, and the first plate having the curable resin composition supplied, may be placed on the movable support mechanism. In such a case, the second plate is attached to a fixed support table provided at an upper portion in the reduced-pressure apparatus, and the first and second plates are permitted to face each other.

Further, both the first and second plates may be supported by movable support mechanisms provided one above the other in the reduced-pressure apparatus.

After positioning the first and second plates at predetermined positions, the inside of the reduced-pressure apparatus is depressurized to a predetermined reduced-pressure atmosphere. If possible, during the depressurizing operation or after depressurized to the reduced-pressure atmosphere, the first and second plates may be positioned at the predetermined positions in the reduced-pressure apparatus.

After the inside of the reduced-pressure apparatus becomes a predetermined reduced-pressure atmosphere, the second plate supported by the movable support mechanism is moved downward to laminate the second plate on the curable resin composition on the first plate.

By such laminating, the curable resin composition is sealed in a space surrounded by the surface of the first plate (in a case where the first plate is a display device, the surface on the side where an image is displayed), the surface of the second plate (in a case where the second plate is a display device, the surface on the side where an image is displayed) and the seal part.

At the time of such laminating, the curable resin composition is spread by the own weight of the second plate, the pressing pressure from the movable support mechanism, etc., so that the curable resin composition is filled in the above-mentioned space, and thereafter, at the time of exposing it to the high pressure atmosphere in step (d), a layer of the curable resin composition with little or no air bubbles will be formed.

At the time of the laminating, the reduced-pressure atmosphere is not more than 100 Pa and preferably at least 10 Pa. If the pressure of the reduced-pressure atmosphere is too low, such a reduced-pressure atmosphere may adversely affect the respective components (such as a curable compound, a photopolymerization initiator, a polymerization inhibitor, a photostabilizer, etc.) contained in the curable resin composition.

For example, if the pressure of the reduced-pressure atmosphere is too low, the respective components are likely to vaporize, or it may take time to provide such a reduced-pressure atmosphere. The pressure of the reduced-pressure atmosphere is more preferably from 15 to 40 Pa.

The period of time from the time when the first and second plates are laminated to the release of the reduced-pressure atmosphere is not particularly limited, and the reduced-pressure atmosphere may be released immediately after sealing of the curable resin composition, or after sealing of the curable resin composition, the reduced-pressure state may be maintained for a predetermined time. By maintaining the reduced-pressure state for a predetermined time, the curable resin composition tends to flow in the sealed space, and the distance between the first and second plates becomes uniform, whereby even if the atmosphere pressure is increased, the sealed state may easily be maintained. The period of time for maintaining the reduced-pressure state may be a long time of at least a few hours, but from the viewpoint of the production efficiency, it is preferably within one hour, more preferably within 10 minutes.

(Step (d))

After releasing the reduced-pressure atmosphere in step (c), the laminated precursor is placed in a pressure atmosphere wherein the pressure of the atmosphere is not less than 50 kPa.

When the laminated precursor is placed in a pressure atmosphere of not less than 50 kPa, the first and second plates are pressed by the increased pressure in a direction to closely adhere to each other, whereby if air bubbles are present in the sealed space in the laminated precursor, the curable resin composition tends to flow into the air bubbles, and the entire sealed space will be uniformly filled by the curable resin composition.

The pressure atmosphere is usually from 80 kPa to 120 kPa. The pressure atmosphere may be an atmospheric pressure atmosphere or may be a pressure higher than the atmospheric pressure atmosphere. The atmospheric pressure atmosphere is most preferred from such a viewpoint that the operation of e.g. curing the curable resin composition can be carried out without requiring any special installation.

The period of time (hereinafter referred to as the high pressure retention time) from the time when the laminated precursor is placed in a pressure atmosphere of not less than 50 kPa to the initiation of the curing of the curable resin composition is not particularly limited. In a case where a process of taking out the laminated precursor from the reduced-pressure apparatus and transferring it to a curing apparatus, and then initiating the curing, is carried out in an atmospheric pressure atmosphere, the time required for such a process is the high pressure retention time. Accordingly, in a case where at the time when the laminated precursor is placed in the atmospheric pressure atmosphere, air bubbles are already not present in the sealed space of the laminated precursor, or air bubbles have disappeared during the process, the curable resin composition can be immediately cured. In a case where it takes time until air bubbles disappear, the laminated precursor is held in the atmosphere under a pressure of not less than 50 kPa until the air bubbles disappear. Further, usually, there will be no trouble even if the high pressure retention time becomes long, and therefore, the high pressure retention time may be prolonged from other necessity of the process. The high pressure retention time may be as long as more than one day, but from the viewpoint of the production efficiency, it is preferably within 6 hours, more preferably within one hour, and from the viewpoint of high production efficiency, it is particularly preferably within 10 minutes.

Also in a case where the curable resin composition is a photocurable resin composition, under a reduced pressure of not less than 50 kPa, light is applied to the photocurable resin composition in the laminated precursor for curing, whereby a display apparatus is produced. For example, by applying ultraviolet rays or visible light with a short wavelength from a light source (such as an ultraviolet lamp or a high pressure mercury lamp), the photocurable resin composition is cured. By the curing of the photocurable resin composition, a resin layer bonding the display device of the display apparatus to the protective plate will be formed.

The light is applied from the side having optical transparency between the first and second plates. In a case where both materials have optical transparency, the light may be applied from both sides.

In the case of the display apparatus, an optical transparency can be obtained by operating transmission type display devices, but many of them do not show optical transparency in a non-operating state, and therefore light for curing is applied from the transparent plate for the protective plate. In a case where a transmission-light scattering type display device which shows a transparent state at the time of non-operating is employed, light from the display device side can be used.

The light is preferably ultraviolet rays or visible light with a wavelength of at most 450 nm. Particularly, in a case where an antireflection layer is provided on the transparent plate, and the antireflection layer or a resin film which formed the antireflection layer does not transmit ultraviolet rays, curing by visible light becomes important.

In a case where a light-shielding printing part is provided on the periphery of the transparent plate, and a seal part or resin layer made of a photocurable resin composition is provided on a region interposed between the light-shielding printing part and the display device, light from an opening portion other than the light-shielding printing part of the transparent plate may not sufficient for curing. In this case, it is preferred to apply ultraviolet rays or visible light with a wavelength of at most 450 nm from the lateral side of the display device, thereby to carry out curing of the resin layers of the seal part and the light-shielding printing part. As the light source for applying light from the side, a light source to be used for applying light from the transparent plate side can be used, LED which emits ultraviolet rays or visible light with a wavelength of at most 450 nm is preferably used from the viewpoint of installation space of the light source. The light application step may be carried out in a manner of applying light from the transparent plate and then applying light from the side of the display device, or in the reverse manner thereof, or in a manner of applying the light at the same time. However, to further accelerate photocuring of the seal part and the resin layer of the light-shielding printing part, it is preferred to apply light from the lateral side firstly, or apply light from the lateral side and light from the transparent plate side at the same time.

SPECIFIC EXAMPLES

In the production process of the present invention, it is optional to use the back plate or the front plate as the first plate. Accordingly, the display apparatus can be produced by the following two methods, depending upon the selection of the first plate.

(A-1) A method of using a display device (the back plate) as the first plate, and a transparent plate 10 (the front plate) for a protective plate as the second plate.

(A-2) A method of using a transparent plate 10 (the front plate) for a protective plate as the first plate, and a display device (the back plate) as the second plate.

Now, taking the case of the method (A-1) as an example, the process for producing a display apparatus will be described in detail with reference to the drawings. Further, in FIGS. 3 to 8, examples wherein a double-sided adhesive tape is used in the seal part formed on the edge of the first plate as a sealing material are illustrated.

(Step (a))

Figure 3:
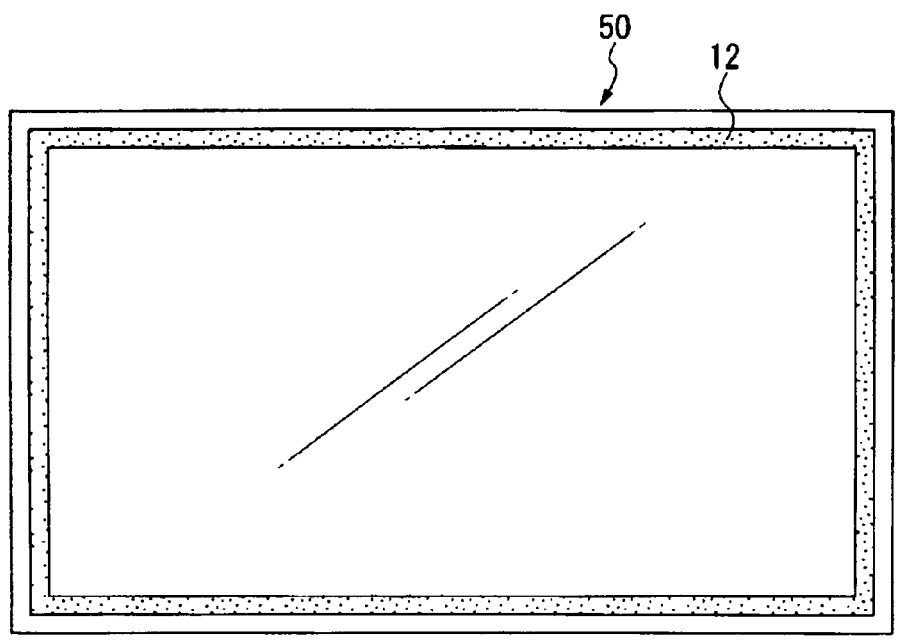
FIG. 3 is a plan view illustrating an example of the state of step (a) in the production process of the present invention.
Figure 4:
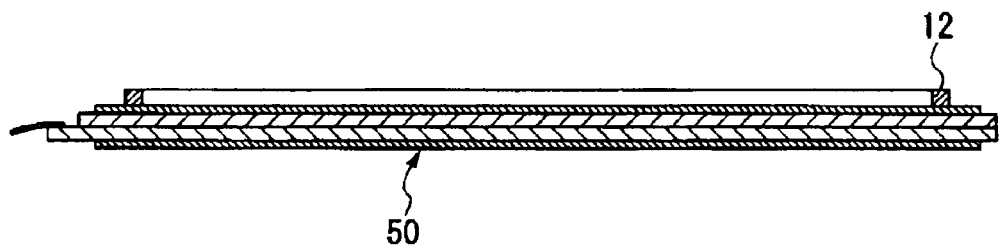
FIG. 4 is a cross-sectional view illustrating an example of the state of step (a) in the production process of the present invention.

As shown in FIGS. 3 and 4, a double-sided adhesive tape 12 is bonded along the edge of a display device 50 (the first plate) to form part of a seal part.

(Step (b))

Figure 5:
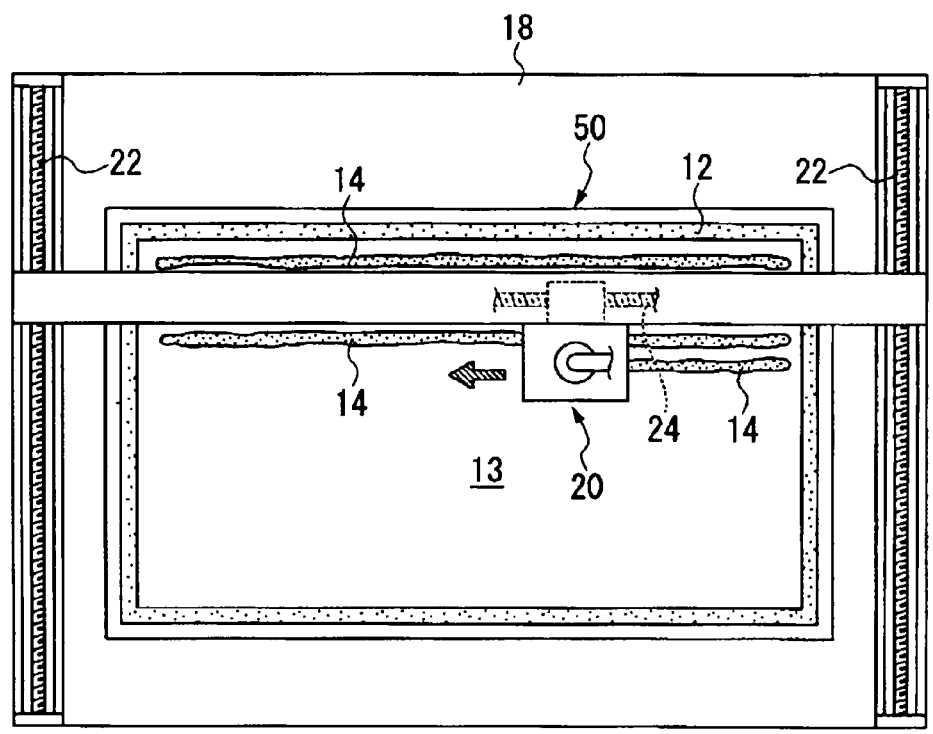
FIG. 5 is a plan view illustrating an example of the state of step (b) in the production process of the present invention.
Figure 6:
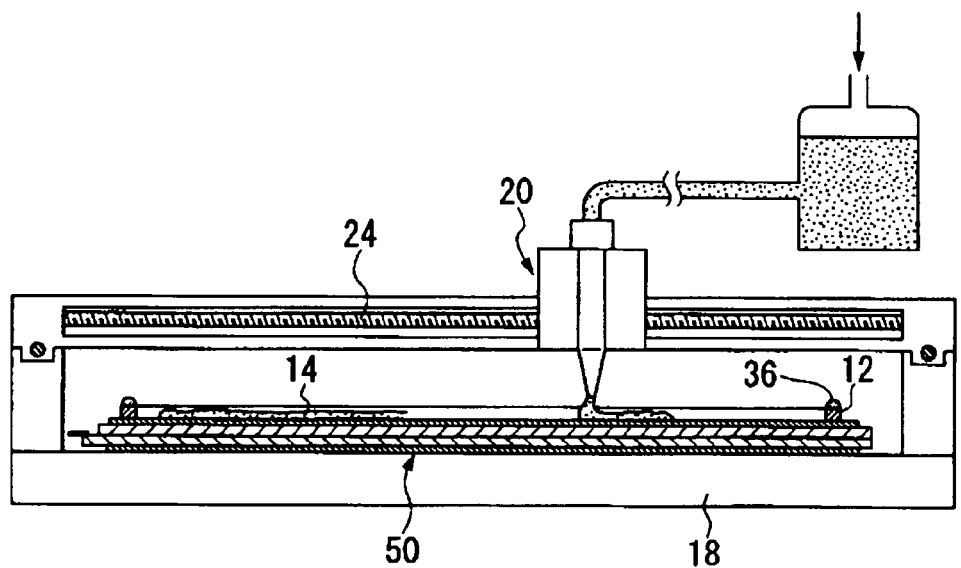
FIG. 6 is a cross-sectional view illustrating an example of the state of step (b) in the production process of the present invention.

Then, as shown in FIGS. 5 and 6, a photocurable resin composition 14 is supplied to a rectangular region 13 enclosed by the double-sided adhesive tape 12 of the display device 50. The amount of the photocurable resin composition 14 to be supplied is preliminarily set to be such an amount that the space sealed by the double-sided adhesive tape 12, the display device 50, and the transparent plate 10 (FIG. 7) is filled with the photocurable resin composition 14.

As shown in FIGS. 5 and 6, the supplying of the photocurable resin composition 14 is carried out by placing the display device 50 horizontally on a lower press platen 18 and supplying the photocurable resin composition 14 in a line shape, in a strip shape or in a dot shape by a dispenser 20 moving in a horizontal direction.

The dispenser 20 is made to be horizontally movable over the entire range of the region 13 by a known horizontal movement mechanism comprising a pair of feed screws 22 and a feed screw 24 perpendicular to the feed screws 22. Here, instead of the dispenser 20, a die coater may be employed.

Further, as shown in FIG. 6, it is preferred to apply a photocurable resin composition 36 for forming a seal part, on the surface of the double-sided adhesive tape 12.

(Step (c))

Figure 7:
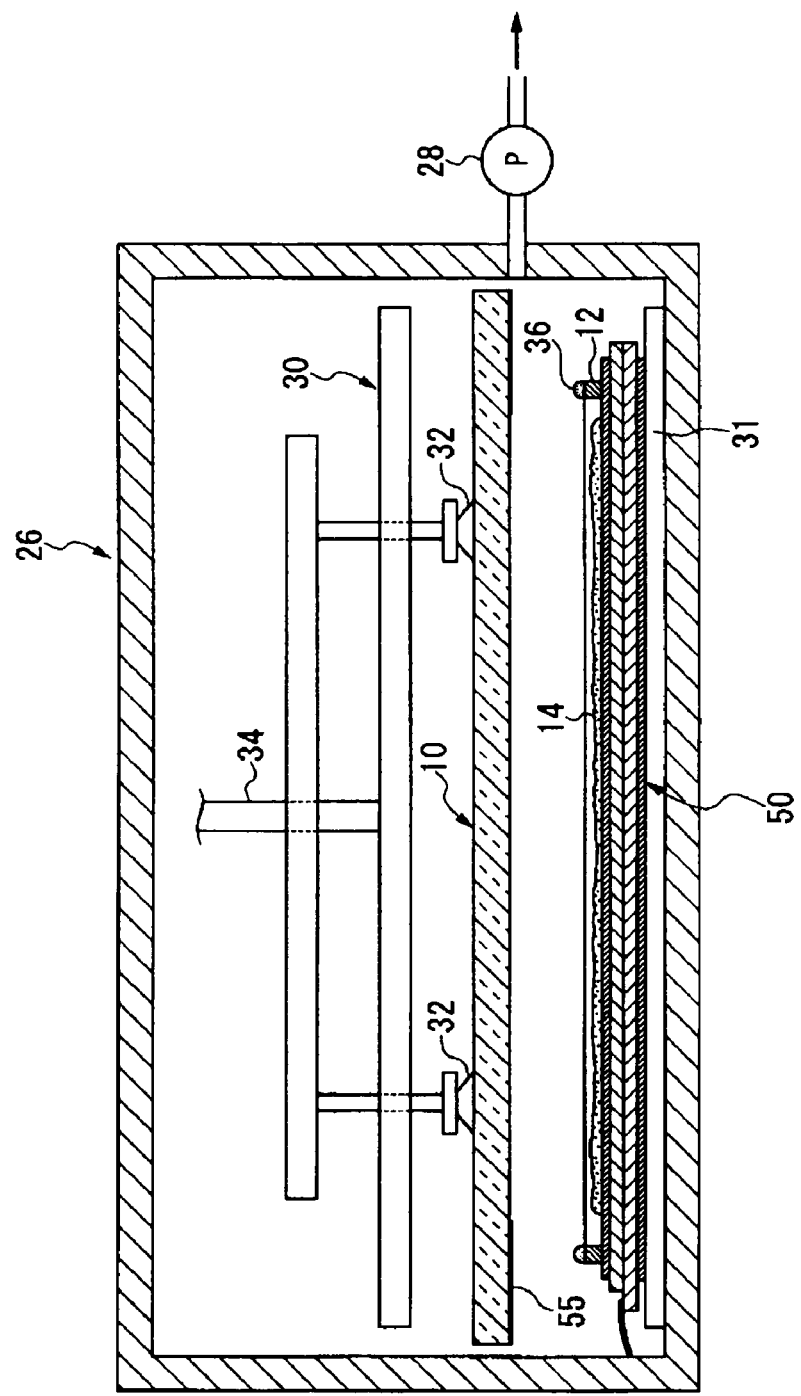
FIG. 7 is a cross-sectional view illustrating an example of the state of step (c) in the production process of the present invention.

Then, as shown in FIG. 7, the display device 50 and the transparent plate 10 (the second plate) are carried into a reduced-pressure apparatus 26. At an upper portion in the reduced-pressure apparatus 26, an upper press platen 30 having a plurality of adsorption pads 32 is disposed, and at a lower portion, a lower press platen 31 is provided. The upper press platen 30 is made to be movable in a vertical direction by an air cylinder 34.

The transparent plate 10 is attached to the adsorption pads 32 so as for the surface having a light-shielding printing part 55 formed, to face downward. The display device 50 is fixed on the lower press platen 31 so as for the side having the photocurable resin composition 14 supplied, to face upward.

Then, the air in the reduced-pressure apparatus 26 is suctioned by a vacuum pump 28. After the atmospheric pressure in the reduced-pressure apparatus 26 reaches a reduced-pressure atmosphere of e.g. from 15 to 40 Pa, the transparent plate 10 is lowered in a state adsorbed and held by the adsorption pads 32 of the upper press platen 30, towards the display device 50 waiting below, by operating the air cylinder 34. And, the display device 50 and the transparent plate 10 are laminated via the double-sided adhesive tape 12 to form a laminated precursor, and the laminated precursor is held in a reduced-pressure atmosphere for a predetermined period of time.

Here, the attached position of the display device 50 to the lower press platen 31, the number of adsorption pads 32, the attached position of the transparent plate 10 to the upper press platen 30, etc. are suitably adjusted depending upon the sizes, shapes, etc. of the display device 50 and the transparent plate

10. At that time, the glass substrate can be held in the reduced-pressure atmosphere stably by using electrostatic chucks as the adsorption pads and adopting the electrostatic chuck holding method as disclosed in the specification of Japanese Patent Application No. 2008-206124.

(Step (d))

Figure 8:
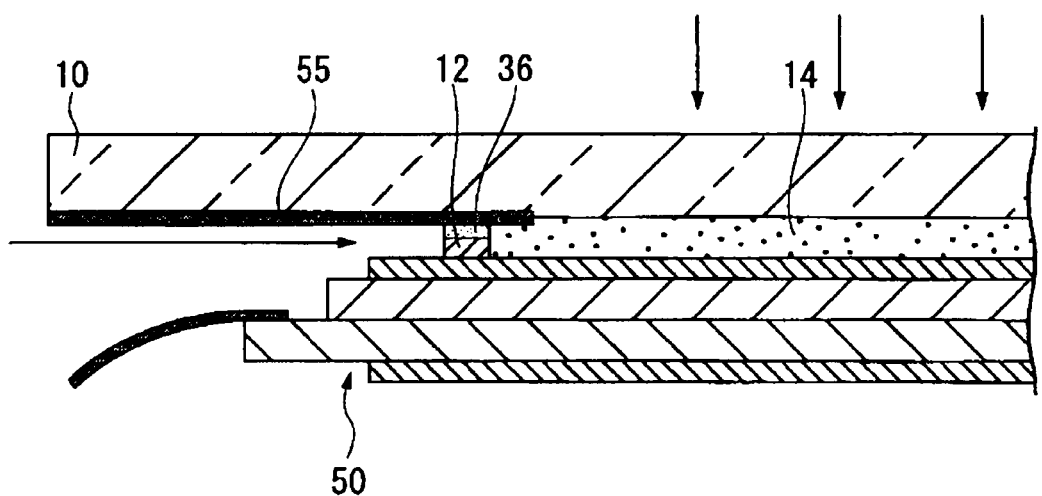
FIG. 8 is a cross-sectional view illustrating an example of the state of step (d) in the production process of the present invention.

Then, the inside of the reduced-pressure apparatus 26 is made to be e.g. atmospheric pressure, whereupon the laminated precursor is taken out from the reduced-pressure apparatus 26. When the laminated precursor is placed in the atmospheric pressure atmosphere, the surface on the display device 50 side and the surface on the transparent plate 10 side of the laminated precursor are pressed by the atmospheric pressure. And the photocurable resin composition 14 in the sealed space is pressed by the display device 50 and the transparent plate 10. By this pressure, the photocurable resin composition 14 in the sealed space will flow, and the entire sealed space will be uniformly filled with the photocurable resin composition 14. Thereafter, as shown in FIG. 8, ultraviolet rays or visible light with a short wavelength is applied from the transparent plate 10 side of the laminated precursor, to cure the photocurable resin composition 14 in the inside of the laminated precursor, and ultraviolet rays or visible light with a short wavelength is applied from the side of the display device 50 to cure the photocurable resin composition 36 for forming a seal part and the photocurable resin composition 14 shadowed by the light-shielding printing part 55, thereby to produce a display apparatus 4.

In the foregoing, the process for producing a display apparatus of the present invention has been described in detail by taking the case of the method (A-1) as an example. However, also in the case of other method (A-2), a display apparatus can be produced in the same manner.

In the case of the method (A-2), seal part is formed on the edge of the surface of the transparent plate on the side where the light-shielding printing part 55 is formed, and a photocurable resin composition is supplied to the region enclosed by the seal part. Then, transparent plate is carried into a reduced-pressure apparatus, and after the inside of the reduced-pressure apparatus is made to be a predetermined reduced-pressure atmosphere, a display device is laminated on the transparent plate to seal the photocurable resin composition, and the obtained laminated precursor is placed in an atmosphere under a pressure of not less than 50 kPa, and the photocurable resin composition is photo-cured to obtain a display apparatus.

In the case where the light-shielding printing part is provided on the transparent plate, it is preferred to cure the resin layers of the seal part and the light-shielding printing part by application of light from the lateral side of the display device before or at the same time of curing the resin layers by application of light from the transparent plate, as mentioned above. Further, in a case where the electrostatic chuck holding method is employed, since static electricity may adversely affect the display performance of the display device, the method (A-1), i.e. a method wherein the display device is set as the first plate and then the transparent plate as the second plate is held by using electrostatic chuck, is preferred. Further, in the case where the area of the second plate is larger than the first plate, the edge of the second plate may be held mechanically without using electrostatic chuck.

(Function Effects)

According to the above-described production process of the present invention, it is possible to produce a display apparatus having a relatively large area without forming air bubbles in the resin layer. Even if air bubbles remain in the curable resin composition sealed under reduced pressure, in a high pressure atmosphere before the curing, the pressure is applied also to the sealed curable resin composition to reduce the volume of the air bubbles, whereby the air bubbles will readily disappear. For example, the volume of a gas in air bubbles in the curable resin composition sealed under 100 Pa is considered to become 1/1,000 under 100 kPa. The gas may be dissolved in the curable resin composition, and the gas in the air bubbles of a very small volume will readily be dissolved in the photocurable resin composition and thus disappear.

Further, even if a pressure such as an atmospheric air pressure is applied to the curable resin composition after sealing, since the liquid curable resin composition is a composition with fluidity, the pressure is uniformly distributed over the surface of the display device, whereby there will be no such a possibility that a higher stress is applied to a part of the surface of the display device in contact with the curable resin composition, and there will be no substantial possibility of a damage of the display device. Further, in a case where the curable resin composition is a photocurable resin composition, a high temperature is not required for the curing, and therefore, there will be no substantial possibility of a damage of the display device by a high temperature.

Further, the interface bonding strength between the resin layer formed by curing the curable resin composition and the display device or the transparent plate is higher than the interface bonding strength by fusion of a thermal fusion resin. Besides, the curable resin composition with fluidity is pressed to adhere to the surface of the display device or the transparent plate and cured in such a state, whereby a higher interface bonding strength can be obtained, and at the same time, uniform bonding to the surface of the display device or the transparent plate can be obtained, thus minimizing the possibility of partial lowering of the interface bonding strength. Therefore, there is little possibility of peeling at the surface of the resin layer, and there is little possibility of inclusion of moisture or a corrosive gas from a portion where the interface bonding strength is insufficient.

Furthermore, as compared with a method (injection method) of injecting a curable resin composition with fluidity to a space having a wide area and a narrow distance between a pair of plates, it is possible to fill the curable resin composition in a short period of time without having substantial formation of air bubbles. Besides, it is possible to easily fill a high viscosity curable resin composition with little restriction with respect to the viscosity of the curable resin composition. Therefore, it is possible to employ a high viscosity curable resin composition containing a relatively high molecular weight curable compound, whereby the strength of the resin layer can be improved.

EXAMPLES

Now, Examples will be described which were carried out to confirm the effectiveness of the present invention. Examples 1 and 3 are working Examples of the present invention, and Example 2 is a Comparative Example.

Example 1

A liquid crystal display device was removed from a commercially available 32-inch liquid crystal television receiver (HDV-32WX2D-V, manufactured by PC DEPOT CORPORATION). The liquid crystal display device was found to have a long side length of 712 mm, a short side length of 412 mm and a thickness of about 2 mm. Both sides of the liquid crystal display device were found to be bonded to polarizing plates, and 6 FPCs for driving were found to be bonded to one side of the long side, and then printed circuit board was found to be bonded to the edge of each FPC. The image display portion was found to have a long side length of 696 mm, and a short side length of 390 mm. Then, such a liquid crystal display device was designated as display device G.

On a peripheral portion of one surface of soda lime glass having a long side length of 794 mm, a short side length of 479 mm and a thickness of 3 mm, a light-shielding printing part was formed in a frame-like shape by printing with a ceramic paint containing a black pigment so that the opening portion becomes to have a long side length of 698 mm and a short side length of 392 mm. Then, to the entire backside of the light-shielding printing part, an antireflection film (Rea-Look X4001, manufactured by NOF CORPORATION) was bonded in a state of having a protective film, thereby to obtain a glass plate H for a protective plate.

(Step (a))

A polypropylene glycol having a number average molecular weight of about 4,000 as calculated from the hydroxy value having molecular terminals partially substituted by ethylene glycol and isophorone diisocyanate were mixed in a molar ratio of about 4:5 and reacted in the presence of a catalyst of a tin compound in a prepolymer, to which 2-hydroxyethyl acrylate was added in a molar ratio of about 1:2 and reacted to obtain an urethane acrylate oligomer (hereinafter referred to as UA-2). Of UA-2, the number of functional groups was 2, the measured value of the number average molecular weight was about 24,000, and the measured value of the viscosity at 25° C. was about 830 Pa·s (measured by E type viscometer, RE-85U manufactured by TOKI SANGYO CO., LTD.).

100 parts by mass of UA-2, 1 part by mass of 1-hydroxycyclohexyl-phenyl-ketone (photopolymerization initiator, product name "IRGACURE 184", manufactured by Ciba Specialty Chemicals), and 0.1 part by mass of bis(2,4,6-trimethylbenzoyl)-phenylphosphine oxide (photopolymerization initiator, product name "IRGACURE 819", manufactured by Ciba Specialty Chemicals) were uniformly mixed to obtain a photocurable resin composition I for forming a seal part.

On an about 5 mm outside position of the image display region of the display device G, the photocurable resin composition I was applied in all surrounding by means of a dispenser in a width of about 1 mm and an applied thickness of about 0.6 mm.

(Step (b))

40 parts by mass of UA-2, 24 parts by mass of 2-hydroxybutyl methacrylate (Light Ester HOB, manufactured by Kyoeisha Chemical Co., Ltd.) and 36 parts by mass of n-dodecyl methacrylate were uniformly mixed, and to 100 parts by mass of such a mixture, 0.2 part by mass of bis(2,4,6-trimethylbenzoyl)-phenylphosphine oxide (IRGACURE 819, manufactured by Ciba Specialty Chemicals) as a photopolymerization initiator, 0.04 part by mass of 2,5-di-t-butyl-hydroquinone as a polymerization initiator, 1 part by mass of 1,4-bis(3-mercaptobutyryloxy)butane (KarenzMT BD-1, manufactured by Showa Denko K.K.) as a chain transfer agent, and 0.3 part by mass of an ultraviolet absorber (TINUVIN 109, manufactured by Ciba Specialty Chemicals), were uniformly dissolved to obtain a photocurable resin composition J.

The photocurable resin composition J was, in an open state as put in a container placed in a reduced-pressure chamber, and the inside of the reduced-pressure chamber was depressurized to about 20 Pa and maintained for 10 minutes to carry out defoaming treatment. The viscosity of the photocurable resin composition J was measured and found to be 1.7 Pa·s (measured by E type viscometer, RE-85U, manufactured by TOKI SANGYO CO., LTD.).

To an internal region of the seal part coated on the edge of the image display region of the image display device G, the photocurable resin composition J was supplied at plural positions by means of a dispenser so that the total mass would be 125 g.

(Step (c))

On the upper surface of a lower press platen in a vacuum chamber wherein a lifting and lowering apparatus comprising a pair of press platens is set, the display device G was placed horizontally so that the surface of the curable resin composition faced upward.

The glass plate H was held on the lower surface of an upper press platen of the lifting and lowering apparatus in the vacuum chamber by means of an electrostatic chuck so that the surface on the side where a light-shielding printing part was formed, faced the display device G and so that as viewed from above, the opening portion of the glass plate H having no light-shielding printing part would be at the same position as the image display region of the display device G with a margin of about 1 mm, and in the vertical direction, the distance from the image display device G would be 30 mm.

The vacuum chamber was made in a sealed state and evacuated until the pressure in the chamber became about 15 Pa. By the lifting and lowering apparatus in the vacuum chamber, the upper and lower press platens were brought to be closer to each other so that the display device G and the glass plate H were pressed under a pressure of 2 kPa via the photocurable resin composition J and held for one minute. The electrostatic chuck was deactivated, and from the upper press platen, the glass plate H was released, and the inside of the vacuum chamber was returned to the atmospheric pressure in about 15 seconds to obtain a laminated precursor E having the photocurable resin composition J sealed by the display device G, the glass plate H and the seal part.

(Step (d))

The photocurable resin composition I forming the seal part provided on the edge of the display device G of the laminated precursor K, light is applied for about 10 minutes over the entire seal part by using an ultraviolet light source wherein ultraviolet ray LED having a dominant wavelength emission of about 390 nm is installed in a line form, from the lateral side of the display device G, to cure the photocurable resin composition I, and the laminated precursor K was held horizontally to stand still for about 10 minutes.

By applying ultraviolet rays and visible light with a wavelength of at most 450 nm from a chemical lamp uniformly from the surface of the glass plate H of the laminated precursor K, the photocurable resin composition J was cured to obtain a display apparatus L. In the display apparatus L, no defects such as air bubbles remaining in the resin layer were observed even though a step of removing air bubbles required at time of producing by a conventional injection method, was not required. Further, its flatness was found to be good.

An assembly was prepared in the same manner by using a transparent glass plate having almost the same size as the display device G, instead of the display device G, and then the haze value at the portion free from the light-shielding printing part was measured and found to be not more than 1%, whereby a good one with a high transparency was obtained. Here, the haze value was a value obtained by the measurement in accordance with ASTM D1003 using a Haze-Gard II manufactured by Toyo Seiki Seisaku-sho, Ltd.

The display apparatus L was returned to the chassis of the liquid crystal television receiver from which the liquid crystal display device was removed, and then wirings were connected again to turn electric supply on. As a result, an image having a higher display contrast comparing to the original one was obtained. No image distortion was observed even if the image display surface was strongly pressed with finger, whereby the glass plate H was found to protect the display device G effectively.

Example 2

To the edge of the display device G, a double-sided adhesive tape having a thickness of 0.5 mm and a width of 2 mm was bonded, and while leaving the release film of the double-sided adhesive tape only along one side, the release film on the surface was peeled. On the glass plate H, the display device G was laminated and bonded by the double-sided adhesive tape along the three sides.

On one side where the release film was left, the space between the double-sided adhesive tape and the display device G was forced open for about 2 mm by a screw driver, and it was attempted to inject 155 g of the photocurable resin composition J from the opened space, but air bubbles remained at a lower portion of the space between the display device G and the glass plate H, and it was not possible to densely inject the photocurable resin composition J into the space.

Example 3

40 parts by mass of UA-2 used in Example 1, 30 parts by mass of 2-hydroxybutyl methacrylate (Light Ester HOB, manufactured by Kyoeisha Chemical Co., Ltd.) and 30 parts by mass of n-dodecyl methacrylate were uniformly mixed, and to 100 parts by mass of such a mixture, 0.5 part by mass bis(2,4,6-trimethylbenzoyl)-phenylphosphine oxide (photopolymerization initiator, IRGACURE 819, manufactured by Ciba Specialty Chemicals), and 0.5 part by mass of n-dodecyl mercaptan (chain transfer agent, THIOKALCOL 20, manufactured by Kao Corporation) were uniformly dissolved to obtain a photocurable resin composition K for forming a resin layer.

The photocurable resin composition K was, in an open state as put in a container, placed in a reduced-pressure chamber, and the inside of the reduced-pressure chamber was depressurized to about 20 Pa and maintained for 10 minutes to carry out defoaming treatment. The viscosity of the photocurable resin composition K was measured and found to be 2.2 Pa·s.

To an internal region of the seal part coated on the edge of the image display region of the image display device G, the photocurable resin composition K was supplied at plural positions by means of a dispenser so that the total mass would be 125 g.

Then, a display apparatus M was obtained in the same manner as in steps (c) and (d) of Example 1. No defects such as air bubbles remaining in the resin layer of the display apparatus M were observed. An assembly was prepared in the same manner by using a transparent glass plate having almost the same size as the display device G, instead of the display device G, and then the haze value at the portion free from the light-shielding printing part was measured and found to be not more than 1%, whereby a good one with a high transparency was obtained. Further, its flatness was also found to be good.

The display apparatus M was returned to the chassis of the liquid crystal television receiver from which the liquid crystal display device was removed, and then wirings were connected again to turn electric supply on. As a result, an image having a higher display contrast comparing to the original one was obtained. No image distortion was observed even if the image display surface was strongly pressed with finger, whereby the glass plate H was found to protect the display device G effectively.

INDUSTRIAL APPLICABILITY

According to the present invention, problems in the production technique of a display apparatus having a display device protected by a transparent plate, and problems in the production technique of a display apparatus having a display device protected by a transparent plate via a curable resin composition having a low viscosity, can be solved. Particularly, it becomes possible to easily obtain a display apparatus having a display device less susceptible to breakage, a high interface bonding strength between the resin layer and the display device and a high interface bonding strength between the resin layer and the transparent plate, wherein formation of air bubbles remained in the resin layer is sufficiently suppressed, and therefore the present invention is useful for a display device having a large area such as a large-sized liquid crystal device.

This application is a continuation of PCT Application No. PCT/JP2010/065762, filed on Sep. 13, 2010, which is based upon and claims the benefit of priorities from Japanese Patent Application No. 2009-220584 filed on Sep. 25, 2009 and Japanese Patent Application No. 2010-179503 filed on Aug. 10, 2010. The contents of those applications are incorporated herein by reference in its entirety.

REFERENCE SYMBOLS

4: Display apparatus (in a case where the display device is a transmission type TFT liquid crystal display device)
10: Transparent plate
12: Double-sided adhesive tape
14: Photocurable resin composition
36: Photocurable resin composition
40: Resin layer
42: Seal part
50: Display device
51: Polarizing plate
52: Transparent plate provided with a color filter
53: Transparent plate provided with TFT
54: FPC
55: Light-shielding printing part

What is claimed is:

1. A process for producing a display apparatus having a display device protected by a transparent plate, comprising first and second plates, of which either one is the display device and the other one is the transparent plate, a resin layer interposed between the first and second plates, and a seal part enclosing the periphery of the resin layer, which process comprises the following steps (a) to (d):
 (a) a step of forming a seal part on the edge of a surface of the first plate (provided that in a case where the first plate is the display device, the seal part is formed on the edge of the surface on the side where an image is displayed),
 (b) a step of supplying a liquid curable resin composition to the region enclosed by the seal part on the first plate,
 (c) a step of laminating, in a reduced-pressure atmosphere of not more than 100 Pa, a second plate on the curable resin composition formed on the first plate thereby to obtain a laminated precursor having the curable resin composition hermetically sealed by the first and second plates and the seal part (provided that in a case where the second plate is a display device, the second plate is laminated so that the surface on the side where an image is displayed, is located on the curable resin composition side), and (d) a step of curing the curable resin composition in such a state that the laminated precursor is placed in a pressure atmosphere of not less than 50 kPa to form a resin layer.

2. The process for producing a display apparatus according to claim 1, wherein the display device is a liquid crystal display device.

3. The process for producing a display apparatus according to claim 1, wherein a light-shielding printing part is provided on the periphery of the transparent plate.

4. The process for producing a display apparatus according to claim 1, wherein the transparent plate is a glass plate.

5. The process for producing a display apparatus according to claim 1, wherein an antireflection layer is formed on one side of the transparent plate.

6. The process for producing a display apparatus according to claim 1, wherein the pressure atmosphere of not less than 50 kPa is an atmospheric pressure atmosphere.

7. The process for producing a display apparatus according to claim 1, wherein the curable resin composition is a photocurable resin composition.

8. The process for producing a display apparatus according to claim 7, wherein the photocurable resin composition comprises at least one compound having, per molecule, from 1 to 3 groups selected from the group consisting of acryloyloxy groups and methacryloyloxy groups, and a photo-polymerization initiator.

9. The process for producing a display apparatus according to claim 7, wherein the photocurable resin composition comprises an oligomer having a molecular weight of at least 1,000 and having, on average per molecule, from 1.8 to 4 curable functional groups which are acryloyloxy groups and/or methacryloyloxy groups, a hydroxyalkylmethacrylate having a $C_{3-8}$ hydroxyalkyl group wherein the number of hydroxy groups is 1 or 2, and a photo-polymerization initiator.

10. The process for producing a display apparatus according to claim 9, wherein the photocurable resin composition further contains an alkylmethacrylate having a $C_{8-22}$ alkyl group.

11. The process for producing a display apparatus according to claim 10, wherein the photocurable resin composition contains an alkylmethacrylate having a $C_{8-22}$ alkyl group in an amount of larger than the content of a hydroxyalkylmethacrylate having a $C_{3-8}$ hydroxyalkyl group wherein the number of hydroxy groups is 1 or 2.

12. The process for producing a display apparatus according to claim 1, which has a step of applying light on a laminated precursor obtained by using the photocurable resin composition as defined in any one of claims 7 to 11 in such a state that the laminated precursor is placed in a pressure atmosphere of not less than 50 kPa to cure the photocurable resin composition.

13. The process for producing a display apparatus according to claim 1, wherein the seal part formed on the edge of the first plate is made of a sealing material comprised of a photocurable resin composition having a viscosity at 25° C. of from 200 to 3,000 Pa·s.

14. The process for producing a display apparatus according to claim 13, wherein the seal part is cured before curing the photocurable resin composition by applying light via the transparent plate.

15. The process for producing a display apparatus according to claim 13, wherein the seal part is cured by applying light from the side of the transparent plate.

16. A display apparatus obtained by the production process as defined claim 1, comprising:
   first and second plates, of which either one is a display device and the other one is a transparent plate;
   a resin layer interposed between the first and second plates; and
   a seal part interposed between the first and second plates, while seamlessly enclosing the periphery of the resin layer.

* * * * *